No. 672,744. Patented Apr. 23, 1901.
M. SCHMIDT.
PROCESS OF WELDING ALUMINIUM AND ALUMINIUM ALLOYS.
(Application filed Oct. 13, 1899.)
(No Model.)
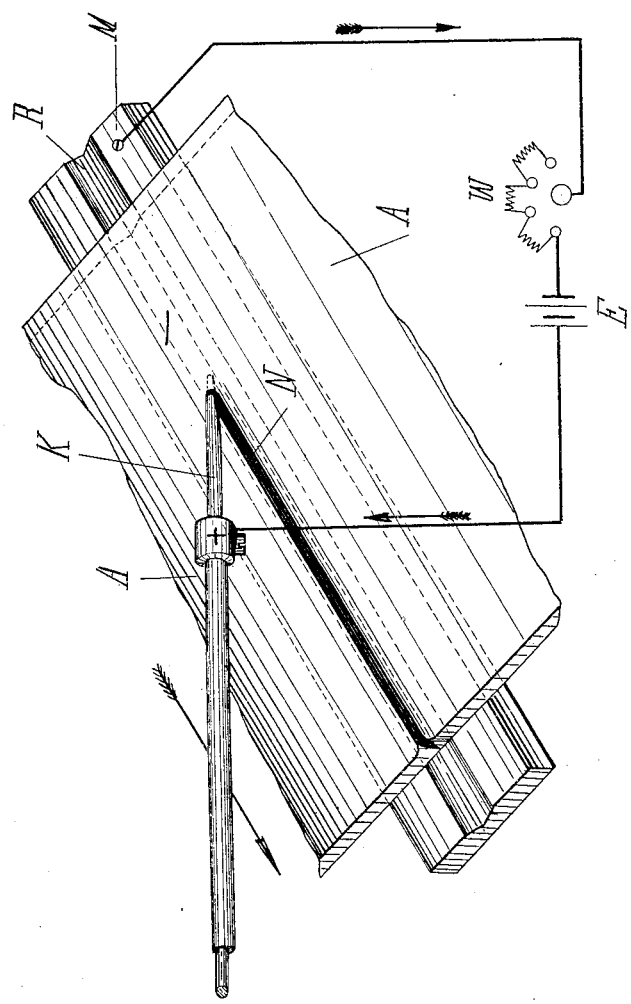

UNITED STATES PATENT OFFICE.

MAX SCHMIDT, OF BERLIN, GERMANY.

PROCESS OF WELDING ALUMINIUM AND ALUMINIUM ALLOYS.

SPECIFICATION forming part of Letters Patent No. 672,744, dated April 23, 1901.

Application filed October 13, 1899. Serial No. 733,542. (No specimens.)

*To all whom it may concern:*

Be it known that I, MAX SCHMIDT, the manager of Gesellschaft für Elektrische Metallbearbeitung, a subject of the German Emperor, and a resident of Berlin, Germany, have invented certain new and useful Improvements in Processes of Welding Aluminium and Aluminium Alloys, of which the following is a specification.

In the processes known and usually employed for soldering or welding aluminium several methods are used for removing the layers of oxid on the parts to be united, as by dissolving or converting the same into liquid slag. These chemical means for cleaning metal surfaces are quite sufficient when a proper solder is employed, but are not effective for welding the parts together by reason of the high temperature required for this operation. In another well-known process of welding liquid aluminium is poured into the seam after treating the same with chemical means.

In my present process of welding aluminium any treatment of the seam with a reducing flux may be avoided, as well as the addition of any metal. A satisfactory weld is obtained by mechanically removing the oxid produced by the heat of welding.

The new process is carried out as follows: After raising the parts to be united to the welding heat, which may be effected by a thin flame (not shown in the drawing) or equivalent means, a solid body of a high fusion-point is inserted into the seam, the heat being maintained, so that said body is frictionally engaged with both metal surfaces, thus removing the thin oxid layers produced by the heat, whereby clean metal surfaces are provided for the welding operation, which may be effected without pressure or hammering. Instead of one solid body I may employ several devices, and particularly where the seam has a large surface or when the parts to be welded are of large size. In order not to affect the shape of the seam and to enable the metal surfaces to be welded together immediately after the cleaning thereof, the solid body engaging said surfaces will be as smooth as possible and preferably in the shape of a stick or rod. Experiments have proved that compressed carbon or platinum is most appropriate for this purpose. Metals such as iron do not act favorably on aluminium, and metals which easily form alloys with aluminium can only be employed when a seam of such alloys is desirable.

The above-described process may be further combined with an electrical heating device adapted to remove the oxid from the seam. In carrying out the process in a mechanical way the device employed—for instance, a carbon or graphite stick—will soon become rough and inoperative by reason of the oxid adhering thereon, while said stick must remain smooth and pointed when a good result is to be attained. To attain the desired end, a current of great strength is passed through the carbon or graphite stick, the direction of said current being such that said stick may be considered an anode, permitting the utilization of the metal liberated by the decomposition of the oxid, while oxygen adheres on the anode, (the carbon stick,) which removes it in a state of purity or in the state of carbon oxid. Although a complete decomposition of the aluminium oxid seems not to be obtainable in this way, because the temperature cannot rise beyond certain limits during the process, nevertheless aluminium oxid appears only in small quantities. Furthermore, the temperature of the metal is favorably raised at the welding-point by the heat of the electric current, whereby the process may be readily carried out. In the mechanical process the stick or equivalent device must be caused to rub on the metal surfaces, while in the electric heating process a mere drawing of the conducting and heat-applying rod along the seam will be sufficient.

In the accompanying drawing I have illustrated means for carrying out the new process, such as will enable others skilled in the art to make and use my invention.

A A represent the parts to be welded together, the seam N of which is somewhat jumped or upset in view of a subsequent hammering thereof. The anvil M is provided with a suitable groove R for enlarging the seam. The carbon stick K, drawn automatically or by hand through the seam, is connected to the positive pole of an electric supply E, while the anvil M is connected to the negative pole thereof.

W represents a regulating-resistance inserted into the circuit.

In order to avoid the production of electric arcs between the carbon stick and the metal when the circuit is opened and closed, I employ a current having a tension of a few volts only.

When two parts of aluminium are brought into contact with each other and when the contacting edges thereof are raised to welding temperature, they cannot be united, as layers of oxid are constantly deposited, which prevent the liquid portions from mixing. The object of the invention is to remove the layers of oxid when the metal is in a liquid state. The common method of cleaning the surfaces by either mechanical means or chemical processes before placing them in contact is not sufficient when aluminium is to be welded.

For the first heating of the seam I may employ an electric arc, oxyhydrogen-blast, or any equivalent means of applying flame and intense heat. In some instances I prefer not to apply such calorific means to the seam at all, finding them too violent and intense, but interpose a solid conducting body of high fusion-point, which may be heated by these or other suitable means and is then applied to the seam as a substitute for such arc or blast. When thus used, the said solid body becomes both a welding and an oxid-removing device. It should of course be infusible at the temperature required for welding aluminium or its alloys.

Having fully described my invention, what I claim, and desire to secure by Letters Patent, is—

The new step in the process of welding aluminium and aluminium alloys consisting in applying to the heated edges of the aluminium a solid body of high fusion-point which forms part of an electric circuit that includes the parts to be welded and moving the said body along between the said edges for the purpose of removing the oxid therefrom both mechanically and electrolytically substantially as set forth.

In witness whereof I have hereunto signed my name this 18th day of September, 1899, in the presence of two subscribing witnesses.

MAX SCHMIDT.

Witnesses:
WOLDEMAR HAUPT,
HENRY HASPER.